US 6,556,920 B2

(12) United States Patent
Kaneko et al.

(10) Patent No.: US 6,556,920 B2
(45) Date of Patent: Apr. 29, 2003

(54) NAVIGATION SYSTEM

(75) Inventors: Michihiro Kaneko, Tsurugashima (JP); Koichi Nagaki, Tsurugashima (JP)

(73) Assignee: Pioneer Corporation, Tokyo-to (JP)

( * ) Notice: Subject to any disclaimer, the term of this patent is extended or adjusted under 35 U.S.C. 154(b) by 0 days.

(21) Appl. No.: 09/730,797

(22) Filed: Dec. 7, 2000

(65) Prior Publication Data

US 2001/0003169 A1 Jun. 7, 2001

(30) Foreign Application Priority Data

Dec. 7, 1999 (JP) ............................................. 11-347877

(51) Int. Cl.⁷ ............................................... G01C 21/32
(52) U.S. Cl. .................. 701/208; 701/201; 342/357.13; 340/990; 709/200
(58) Field of Search ................................ 701/300, 213, 701/207, 200, 201, 208, 215, 220, 217, 216; 342/357.13, 357.06, 357.08, 452; 340/995, 988, 990; 33/13 D, 1 CC; 709/217, 200; 324/72; 455/343; 345/174

(56) References Cited

U.S. PATENT DOCUMENTS

| 4,796,189 A | | 1/1989 | Nakayama et al. ......... 364/449 |
| 5,268,844 A | * | 12/1993 | Carver et al. ............... 342/452 |
| 5,406,493 A | | 4/1995 | Goto et al. .................. 364/449 |
| 5,878,369 A | * | 3/1999 | Rudow et al. ............... 340/990 |
| 5,887,269 A | * | 3/1999 | Brunts et al. ............... 340/990 |
| 5,963,884 A | * | 10/1999 | Billington et al. ............. 702/56 |
| 6,016,606 A | * | 1/2000 | Oliver et al. ............... 33/1 CC |
| 6,049,753 A | * | 4/2000 | Nimura ....................... 701/200 |
| 6,125,323 A | * | 9/2000 | Nimura et al. .............. 340/988 |
| 6,133,871 A | * | 10/2000 | Krasner ................. 342/357.06 |

FOREIGN PATENT DOCUMENTS

DE 198 37 617 A1 3/1999

* cited by examiner

Primary Examiner—Thomas G. Black
Assistant Examiner—Ronnie Mancho
(74) Attorney, Agent, or Firm—Morgan, Lewis & Bockius LLP

(57) ABSTRACT

A navigation system detects a present position of a movable body and performs a navigation for the movable body on the basis of map information. The navigation system is provided with: a storage device (15) of non-volatile type capable of writing the map data thereinto and reading the map data therefrom; a map data transferring device (11) for obtaining the map data corresponding to a predetermined area, and transferring and storing the map data corresponding to the predetermined area to the storage device; an empty area judging device (11) for judging whether or not an empty storage area having a predetermined capacity is reserved in the storage device when the map data transferring device is to transfer the map data corresponding to the predetermined area to the storage device; and an erasing device (11) for determining unnecessary data among data stored in the storage device on the basis of a predetermined condition, and erasing the unnecessary data from the storage device if the empty area judging device judges that the empty storage area is not reserved.

16 Claims, 12 Drawing Sheets

FIG. 2
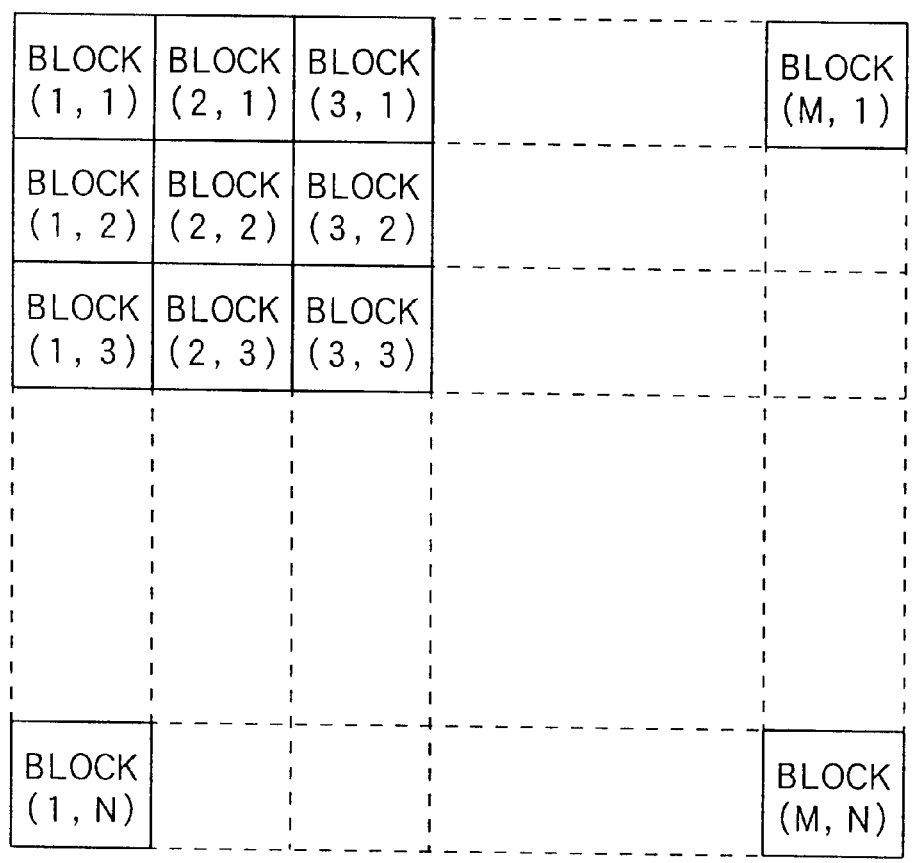
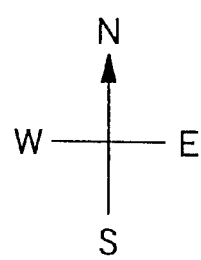

FIG. 3

| DATA ORDER | BLOCK MAP DATA NAME |
|---|---|
| 1 | BLOCK (1, 1) |
| 2 | BLOCK (2, 1) |
| 3 | BLOCK (3, 1) |
| ⋮ | ⋮ |
| M | BLOCK (M, 1) |
| M+1 | BLOCK (1, 2) |
| M+2 | BLOCK (2, 2) |
| M+3 | BLOCK (3, 2) |
| ⋮ | ⋮ |
| 2M+1 | BLOCK (1, 3) |
| 2M+2 | BLOCK (2, 3) |
| 2M+3 | BLOCK (3, 3) |
| ⋮ | ⋮ |
| M(N−1)+1 | BLOCK (1, N) |
| ⋮ | ⋮ |
| M−N | BLOCK (M, N) |

| DATA NAME | THE NUMBER OF ACCESSES | DATE AND TIME OF ACCESS |
|---|---|---|
| DATA 1 | 12 | 1999/11/14 11:55 |
| DATA 2 | 3 | 1999/2/18 12:25 ← ERASE-TARGET BY 3rd METHOD |
| DATA 3 | 8 | 1999/11/14 11:23 |
| DATA 4 | 0 | 1999/3/10 12:25 ← ERASE-TARGET BY 2nd METHOD |
| DATA 5 | 2 | 1999/3/10 12:55 |
| DATA 6 | 4 | 1999/3/10 13:10 |
| DATA 7 | 0 | 1999/10/3 20:50 |
| DATA 8 | 1 | 1999/11/18 10:05 |
| DATA 9 | 1 | 1999/11/18 10:05 |
| DATA 10 | 1 | 1999/11/18 10:05 |

| DATA NAME | THE NUMBER OF ACCESSES | DATE AND TIME OF ACCESS |
|---|---|---|
| DATA 1 | 12 | 1999/11/14 11:55 |
| DATA 11 | 0 | 1999/11/23 19:41 ← NEWLY REGISTERED MANAGEMENT INFORMATION |
| DATA 3 | 8 | 1999/11/14 11:23 |
| DATA 4 | 0 | 1999/3/10 12:25 |
| DATA 5 | 2 | 1999/3/10 12:55 |
| DATA 6 | 4 | 1999/3/10 13:10 |
| DATA 7 | 0 | 1999/10/3 20:50 |
| DATA 8 | 1 | 1999/11/18 10:05 |
| DATA 9 | 1 | 1999/11/18 10:05 |
| DATA 10 | 1 | 1999/11/18 10:05 |

NAVIGATION SYSTEM

BACKGROUND OF THE INVENTION

1. Field of the Invention

The present invention relates to a navigation system for carrying out a navigation operation by using map data, and more particularly relates to a navigation system having a hard disc for storing the map data.

2. Description of the Related Art

There is a navigation system, which has a DVD-ROM (DVD-Read Only Memory) drive or a CD-ROM (Compact Disc—Read Only Memory) drive, reads map data stored in a DVD-ROM or a CD-ROM as a record medium, and carries out a navigation operation. When carrying out the navigation operation, the navigation system detects a self-car position, reads the map data around the car from the record medium, and then displays a map picture generated on the basis of the map data together with a mark indicative of the self-car position on a display screen.

On the other hand, it may be considered that the navigation system is equipped with, for example, a hard disc, as a non-volatile memory having a large capacity, besides the record medium. If the map data of the DVD-ROM or the like is installed in the hard disc, and then the map data is read from the hard disc at a time of the navigation operation, the DVD-ROM or the like can be used for another purpose. Also, since an access speed for the hard disc is very fast, this has a merit from the viewpoint of a fast drawing on a display screen.

By the way, the DVD-ROM has a large storage capacity i.e., as large as 4.7 Gigabytes in a case of a one-surface one-layer type, and 8.5 Gigabytes in a case of a one-surface two-layer type. Thus, there arises a considerable amount of waste if a storage area of such a large storage capacity is reserved in the hard disc just to deal with the map data in, when considering the usage of the hard disc for another purpose. It is therefore desirable to limit the storage capacity reserved for storing the map data of the hard disc, and to selectively store only the map data necessary for the navigation operation.

However, it is not easy to judge in advance the portion of the map data necessary for the navigation operation among the map data stored in the DVD-ROM or the like. Further, in case that the map data supposed to be used is stored in the hard disc in advance, an empty storage area to newly store the map data necessary for the navigation operation afterward may run short. When it happens, although the data judged by the user to be unnecessary may be selectively erased so as to reserve the empty area of the hard disc, this would induce a time and labor consuming operation for the user.

SUMMARY OF THE INVENTION

The present invention is proposed in view of the above mentioned problems. It is therefore an object of the present invention to provide a navigation system, which has a hard disc, can transfer map data required for the navigation operation to the hard disc and can automatically erase the map data not required for the navigation operation, so that the user's operation can be easily performed and the storage area of the hard disc can be efficiently utilized.

The above object of the present invention can be achieved by a navigation system for detecting a present position of a movable body and performing a navigation for the movable body on the basis of map information. The navigation system is provided with: a storage device of non-volatile type capable of writing the map data thereinto and reading the map data therefrom; a map data transferring device for obtaining the map data corresponding to a predetermined area, and transferring and storing the map data corresponding to the predetermined area to the storage device; an empty area judging device for judging whether or not an empty storage area having a predetermined capacity is reserved in the storage device when the map data transferring device is to transfer the map data corresponding to the predetermined area to the storage device; and an erasing device for determining unnecessary data among data stored in the storage device on the basis of a predetermined condition, and erasing the unnecessary data from the storage device if the empty area judging device judges that the empty storage area is not reserved.

According to the navigation system of the present invention, the navigation system is provided with the storage device, such as a hard disc or the like. In operation, the map data corresponding to the predetermined area, such as a peripheral area of the present position or the like, is obtained and transferred to the storage device. At this time, it is judged whether or not the empty storage area enough to store the map data to be transferred is reserved in the storage device. Then, if it is judged that the empty storage area runs short, the unnecessary data is determined on the basis of the predetermined condition, and the determined unnecessary data is erased from the storage device.

Therefore, the new map data to be transferred can be written into the storage device, whose empty storage area is certainly increased by erasing the unnecessary data. Thus, it is possible to avoid such a situation that the new map data cannot be stored in the storage device because the total amount of the map data exceeds the capacity of the storage device. In this manner, since the unnecessary data is automatically judged, it is easy and comfortable to use the navigation system of the present invention. Further, the storage area of the storage device is not occupied at a more than enough level, and the map data can be efficiently used.

In one aspect of the navigation system of the present invention, the navigation system is further provided with a map data reading device for accommodating a record medium, in which the map data is recorded, and reading the map data from the record medium.

According to this aspect, the navigation system is provided with the map data reading device for reading the map data from the record medium, such as a DVD-ROM, a CD-ROM or the like, so that the map data read from this record medium is transferred and stored to the storage device. Therefore, once the transferring process is performed, after that, it is not necessary to set the record medium for the map data to the map data reading device. This is very convenient for the user. Further, even if the transferring processes are repeatedly performed while exchanging the record medium one after another, since the map data is stored into the storage device after erasing the unnecessary data, it is possible to always use the new and useful map data.

In another aspect of the navigation system of the present invention, the erasing device determines the unnecessary data among the map data transferred and stored in the storage device.

According to this aspect, if the empty storage area is not reserved when the map data is to be transferred, the unnecessary data is determined among the map data stored in the storage device, and is then erased. Therefore, it is possible to keep the storage capacity for the whole map data in the storage device in a constant range, so that it is possible to continue the navigation without harmfully influencing the various data other than the map data stored in the area other than the map data storage area.

In this aspect, the erasing device may determine the map data corresponding to an areal block, which is the farthest from the present position, as the unnecessary data.

By constituting in this manner, if the empty storage area is not reserved when the map data is to be transferred, the distance between the present position and the areal block corresponding to each block map data is respectively obtained, and the map data in the areal block farthest from the present position is erased as the unnecessary data. Therefore, since the possibility that the movable body travels through the areal block, which is far from the present position, is relatively low as compared with a near areal block, it is possible to store the map data, having the higher usability in the storage device.

Alternatively in this aspect, the erasing device may determine the unnecessary data on the basis of management information, which is correlated with the map data stored in the storage device.

By constituting in this manner, if the empty storage area is not reserved when the map data is to be transferred, the management information is referred to, which is correlated with the respective map data stored in the storage device, and the unnecessary data is erased on the basis of the management information. Therefore, it is possible to determine the map data to be erased on the basis of the management information, such as access information, data type information etc., as for the respective map data, so that the usability of the map data stored in the storage device can be improved.

In this case, the management information may include the number of accesses for the map data stored in the storage device, and the erasing device may determine the map data, the number of accesses for which is the minimum, as the unnecessary data.

By constituting in this manner, if the empty storage area is not reserved when the map data is to be transferred, the number of accesses included in the management information is referred to, and the map data, the number of accesses for which is the minimum, is erased as the unnecessary. Therefore, since the map data whose usage frequency in the past navigation operation is low is selectively erased, the map data whose usability is relatively large is kept in the stored device.

In this case of using the management information, the management information may include date and time of access for the map data stored in the storage device, and the erasing device may determine the map data, the date and time of access for which is the oldest, as the unnecessary data.

By constituting in this manner, if the empty storage area is not reserved when the map data is to be transferred, the date and time of access included in the management information is referred to, and the map data, the date and time of access for which is the oldest, is erased as the unnecessary. Therefore, since the map data corresponding to the areal block where the user has never traveled for a long time is selectively erased, the map data whose usability is relatively large with reflecting the possibility of usage is kept in the stored device.

In the aspect of having the map data reading device, the storage device may be capable of writing and reading the map data at an access speed faster than that of the map data reading device.

By constituting in this manner, since the access speed of the storage device is higher than that of the map data reading device, it is possible to speedily perform the transferring process and the erasing process of the map data, so that the speedy navigation operation can be performed.

In this case, the storage device may include a hard disc device.

By constituting in this manner, since the hard disc device is used as the storage device, it is possible to utilize the storage device by transferring the map data to the storage device, which is speedily accessible, which has a large storage capacity and whose flexibility is high.

Further in this case, a map data storage area for storing the transferred map data may be set in the storage device.

By constituting in this manner, a certain storage area of the storage device is set as the map data storage area, and the transferred map data is stored into the map data storage area. Therefore, even if the storage capacity of the map data storage area is relatively small, it is possible to store the effective map data by the erasing process, and it is also possible to utilize the area other than the map data storage area, for another data, so that the application range of the storage range can be enlarged.

In another aspect of the navigation system of the present invention, the map data comprises a plurality of block map data for each unit block obtained by dividing a whole map into unit blocks, and writing and reading with respect to the storage device is performed by the block map data as unit.

According to this aspect, for example, the whole map such as an all Japan area is divided into a mesh shape, so that the map data is constructed as a set of a plurality of the block map data, as for each unit block, which is the division unit for the mesh shape. Then, this block map data is treated as the unit of accessing in the storage device. Thus, the transferring process and the erasing process of the map data may be performed in the order of the corresponding block map data by setting the unit block. Therefore, the process can be simplified.

In this aspect, all of the plurality of block map data may have data sizes same to each other.

By constituting in this manner, one block map data may be erased and then the new block map data may be immediately stored, if the erasing process is required in accompaniment with the transferring process of the map data. Therefore, the process can be even more simplified.

Also in this aspect, the map data transferring device may judge whether or not the block map data to be transferred is already stored in the storage device, and may transfer the block map data only if it is not judged to be stored in the storage device.

By constituting in this manner, when transferring the block map data, the presence and absence of the same block map data in the storage device is firstly judged. Then, only if it is absent, the block map data is transferred. Therefore, by avoiding the useless transferring process as well as the useless erasing process, a speedy navigation can be performed.

In another aspect of the navigation system of the present invention, the navigation system is further provided with a communication device for obtaining the map data to be transferred and stored to the storage device.

According to this aspect, the map data is obtained through the communication device, and is then transferred and stored to the storage device. Thus, since a device such as a map data reading device for a record medium or the like is eliminated but the communication device is used, it is possible to simplify the structure of the navigation system. Further, even in such a situation that the communication is temporarily interrupted or stopped, the navigation can be still continued by using the map data already stored in the storage device, so that the reliability of the navigation system is certainly improved.

In this case, the communication device may be a portable telephone.

By constituting in this manner, since the map data can be obtained by the portable telephone, it is possible to even more simplify the structure of the navigation system.

Also in this case, the communication device may obtain the map data through a communication network.

By constituting in this manner, since the map data can be obtained through the communication network, it is possible to even more simplify the structure of the navigation system.

The nature, utility, and further features of this invention will be more clearly apparent from the following detailed description with respect to preferred embodiments of the invention when read in conjunction with the accompanying drawings briefly described below.

BRIEF DESCRIPTION OF THE DRAWINGS

FIG. 2 is a diagram explaining a concept of a block as a division unit of map data in the embodiment;

FIG. 3 is a diagram showing an example of a data structure when the map data is recorded in a DVD-ROM in the embodiment;

FIG. 9 is a diagram showing a storage condition of the hard disc before erasing the map data in relation to a judgment of the block map data not required for the navigation operation in the embodiment;

FIG. 11 is a diagram showing a storage condition of the hard disc after applying an erasing operation by a third method in relation to a judgment of the block map data not required for the navigation operation in the embodiment.

DETAILED DESCRIPTION OF THE PREFERRED EMBODIMENTS

Preferred embodiments of the present invention will be explained below with reference to the drawings.

Figure 1:
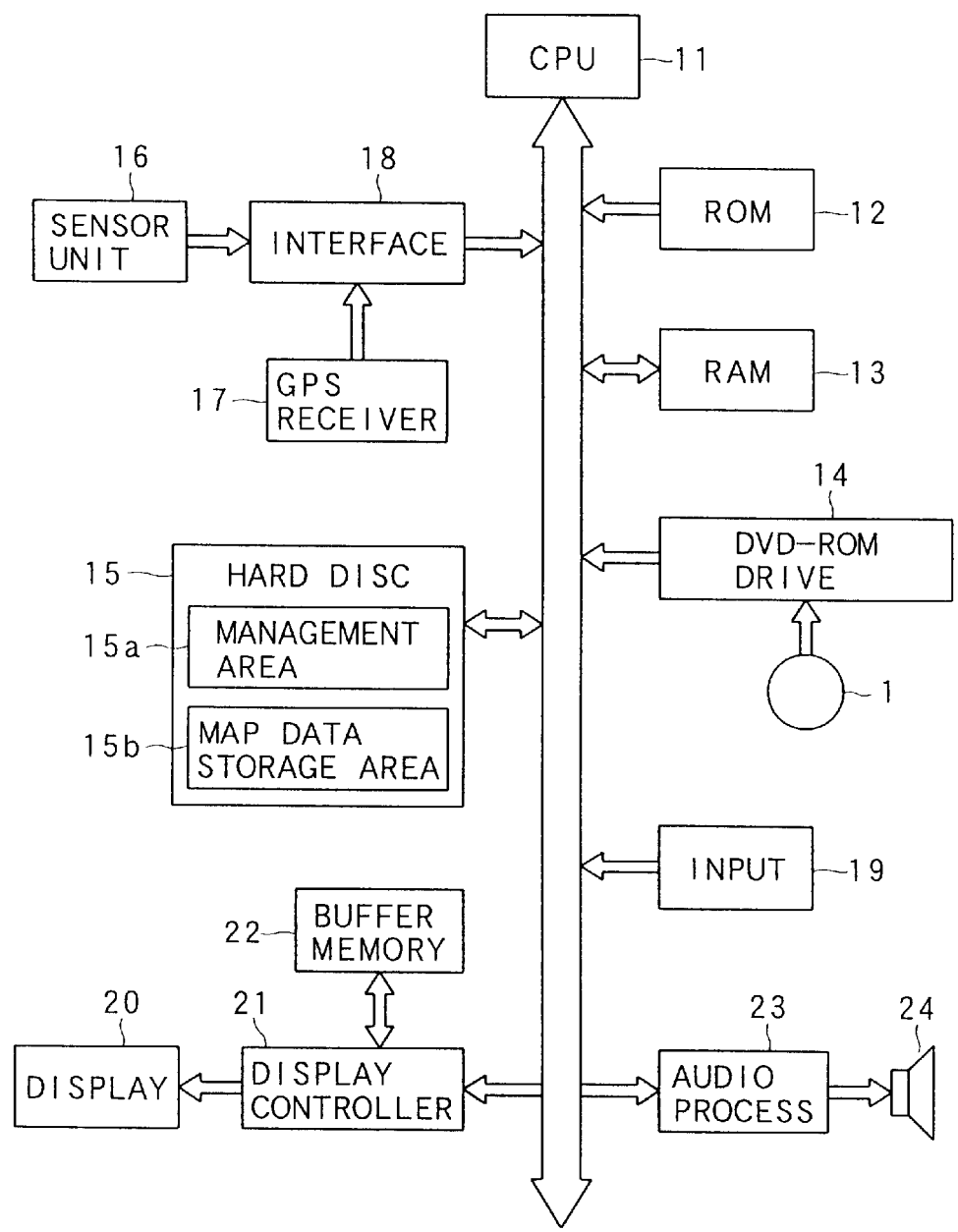
FIG. 1 is a block diagram showing an entire configuration of a navigation system as an embodiment of the present invention.

FIG. 1 is a block diagram showing the entire configuration of a navigation system as the embodiment. The navigation system shown in FIG. 1 is provided with a CPU 11, a ROM 12, a RAM 13, a DVD-ROM drive 14, a hard disc 15, a sensor unit 16, a GPS receiver 17, an interface 18, an input device 19, a display device 20, a display controller 21, a buffer memory 22, an audio process circuit 23 and a speaker 24.

In FIG. 1, the CPU 11 controls the entire operation of the navigation system. The CPU 11 is connected through an inner bus to the respective constitutional elements of the navigation system. The CPU 11 reads a control program stored in the ROM 12 through the inner bus. The CPU 11 carries out the control program while transiently storing data, which is currently being processed, into the RAM 13. The CPU 11 functions as examples of a map data transferring device, an empty area judging device and an erasing device of the present invention.

The DVD-ROM drive 14 functions as one example of a map data reading device of the present invention, contains a DVD-ROM 1 for storing the map data, and carries out an operation of reading the map data. The DVD-ROM 1 is a record medium having a large storage capacity, such as 4.7 Gigabytes in case of the one-surface one layer type and 8.5 Gigabytes in case of the one-surface two-layer type. Pits corresponding to the record data are formed on the DVD-ROM 1. The record data is read by using an optical pickup of the DVD-ROM drive 14.

The DVD-ROM 1 stores therein the map data including road situation data necessary for a navigation operation. Moreover, various related data, such as related facility data, name data and the like are stored while they are correlated with the road situation data. In this embodiment, the entire map is divided into blocks, as meshed unit areas. The map data corresponding to each block is managed as each "block map data". A plurality of block map data are recorded in the DVD-ROM 1.

FIG. 2 is a diagram explaining a concept of the block serving as a division unit of the map data in the DVD-ROM 1. As shown in FIG. 2, the map data of the DVD-ROM 1 is divided into respective meshed blocks, such that the entire area on the map is divided into M blocks in the east and west directions and N blocks in the south and north directions, and is managed. In FIG. 2, a block (i, j) is defined as a block at a grid i from the west and at a grid j from the north. A total of M×N blocks having the same shape are gathered from a block (1, 1) in the northwest corner to a block (M, N) in the southeast corner, and constitute the entire map data.

In FIG. 2, it is described that the entire area on the map is rectangular, and further, a block at each unit is also a rectangular area. Actually, there may be a case of dealing with a map having a complex entire shape. So, the shapes of the respective blocks are not limited to the same shape. In the following explanation, it is assumed that the respective blocks are the rectangular areas having the same shape, for the purpose of easy illustration. However, the present invention can be applied to a case that the shape of the block is more complex.

FIG. 3 is a diagram showing an example of a data structure when the map data at each block unit shown in FIG. 2 is recorded in the DVD-ROM 1. In FIG. 3, each block map data includes the road situation data of each block and the related data associated with it. A particular name is given to each block map data at each block, so as to be identified. A plurality of block map data are sequentially arranged and recorded in the DVD-ROM 1, as for the respective M×N blocks. A data order of the block map data shown in FIG. 3 is only one example. They may be stored in a data order different from it. Also, they may be stored in a different storage area for each data type of each block.

In FIG. 1 again, the hard disc 15 is a non-volatile type memory for reading and writing the various data such as the map data and the like, and functions as one example of a storage device of the present invention. In this embodiment, the hard disc 15 can be used for many purposes, and can store therein the various data such as music data, video data, an application program and the like.

In the hard disc 15, a management area 15a, where various kinds of management information are written in such a manner that they can be updated, is prepared in correlation with the data, which has already been stored. Also, one portion of the hard disc 15 is assigned as a map data storage area 15b, which is as an area for storing the map data to be transferred. For example, about 1 to 2 Gigabytes in the hard disc 15 may be assigned to the map data storage area 15b. As the storage capacity of the hard disc 15 becomes the larger, the larger storage capacity may be assigned to the map data storage area 15b.

The sensor unit 16 is provided with various sensors required to detect a self-car position. Actually, it contains a car speed sensor, a travel distance sensor and an azimuth sensor to detect a travel situation of the car and the like. The GPS receiver 17 receives an electric wave from a GPS (Global Positioning System) satellite, and outputs measurement data. On the basis of the sensor outputs from the sensor unit 16 and the measurement data from the GPS receiver 17, the CPU 11 synthetically detects the self-car position of the self-vehicle during traveling.

The interface 18 carries out an interface operation between (i) the sensor unit 16 and the GPS receiver 17 and (ii) the CPU 11. The CPU 11 obtains the self-car position data, on the basis of the measurement data from the GPS receiver 17 and sensor outputs from the sensor unit 16. This self-car position data is correlated with the above-mentioned map data by the CPU 11, and is corrected by using a map matching process and the like.

The input device 19 is constituted by a key portion mounted on a main body of the navigation system, or a remote controller having a key portion, and sends a signal corresponding to a key input to the CPU 11 in order to carry out a desirable operation in the navigation operation.

The display device 20 is used for the navigation operation, and it is composed of, for example, a CRT, a liquid crystal display or the like. The map data is displayed on the display device 20, in various manners under a control of the display controller 21. The self-car position is displayed as a car mark overlapping with the map data. The display controller 21 generates the display data to be displayed on the display device 20. While transiently storing the display data into the buffer memory 22, the display controller 21 reads the display data from the buffer memory 22 at a proper timing, and outputs and displays it on the display device 20.

The audio process circuit 23 generates a predetermined audio signal under the control of the CPU 11. The audio signal amplified to a proper level by the audio process circuit 23 is outputted as a sound from the speaker 24 to an external portion. As such an audio signal, for example, there is a guidance voice to guide a route for the car.

In the present embodiment, the map data recorded in the DVD-ROM 1 is read out at the time of the navigation operation. Then, the displaying process on the displaying device 20 and the map matching process are performed, and the map data required for the navigation operation is transferred and stored to the hard disc 15 at an appropriate timing. The operation of transferring the map data is performed for each block as the transfer target within the area defined by a predetermined condition with respect to the self-car position as a standard. Then, when storing the map data into the hard disc 15, if an empty storage area (i.e., an available data storage area or available capacity where data can be newly stored) of the map data storage area 15b runs short, the map data selected in accordance with the predetermined condition is erased as described layer, and new map data is stored into the area where the map data is selectively erased. After that, the map data is read out from the hard disc 15 in place of the DVD-ROM 1, so as to perform the navigation operation.

Figure 4:
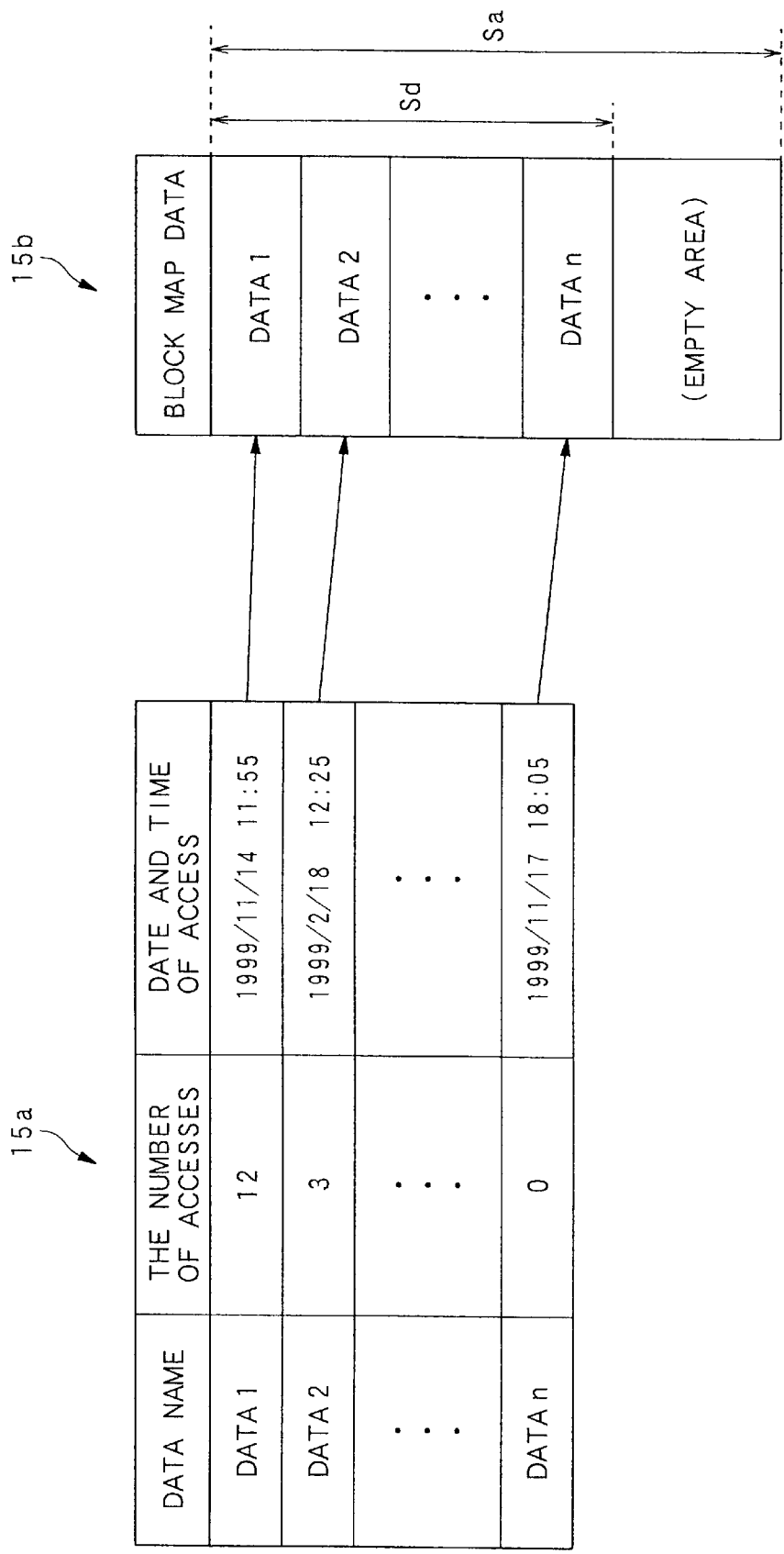
FIG. 4 is a diagram explaining a relationship between a management area and a map data storage area of a hard disc in the embodiment.

Next, the relationship between the management area 16a and the map storage area 15b in the hard disc 15 is explained with reference to FIG. 4. In FIG. 4, management information correlated with each block map data stored in the map data storage area 15b is stored in the management area 15a. The management information includes the data name, the number of accesses, and the date and time of access. In FIG. 4, it is assumed that the management information correlated with n blocks of block map data indicated by the data names of "DATA 1" to "DATA n" for convenience sake are stored in the management area 15a.

The data name in the management area 15a is a name to identify the respective block map data. For example, the data name corresponds to the file name in case that one file is assigned to respective one of the block map data. As described later, since it is necessary to obtain the distance between the self-car position and the block corresponding to the block map data, it is assumed that the block position can be determined on the map in FIG. 2, on the basis of the block name.

The number of accesses is the number that the respective block map data in the map data storage area 15b is accessed. In the present embodiment, the number of accesses is set to "0" when the block map data is written, and is incremented one by one each time when the block map data is read out after that. In case that the block map data in the map data storage area 15b is erased and the new block map data is over-written, the number of accesses is set to "0" again. Thus, the number of accesses is coincident with the number of times of reading out the respective block map data stored in the map data storage area 15b.

The date and time of access is the date and time when the respective block map data in the map data storage area 15b is accessed at the latest. For example, as the date and time of the DATA 1 shown in FIG. 4, since the number of accesses is 12, the date and time of reading out the DATA 1 at the $12^{th}$ time is recorded. Incidentally, in case that the number of accesses is "0", the date and time when storing the block map data becomes the date and time of access. In other cases, the date and time of reading out the block map data at the latest becomes the date and time of access.

On the other hand, as shown in FIG. 4, a plurality of the block map data corresponding to the management information stored in the management area 15a are stored into the map data storage area 15b in the order of same as that in the management area 15a. Assuming that the sum value of the data sizes of a plurality of the block map data, which are actually stored, is Sd and the storage capacity assigned to the map data storage area 15b is Sa, the empty storage area of Sa−Sb is reserved in the map data storage area 15b. Here, in case that all the block map data have the data sizes S which are substantially equal to each other, the size "Sa–Sb" of the empty storage area may be compared with the data size S. As a result, in case that the empty storage area is less than the data size S, since the new block map data cannot be stored into the map data storage area 15b, the later described erasing process is performed.

Incidentally, FIG. 4 shows only the management information related to the erasing process of the map data described layer as one example of the management area 15a, the management information other than this may be employed. For example, the data size and the block position of each block map data may be included in the management information. Further, in the management area 15a, the management information correlated with the various data other than the block map data may be stored in the management area 15a.

Next, the process of transferring the map data to the hard disc 15 to be carried out in the navigation system will be described below with reference to FIG. 5 to FIG. 11. Here, the transferring process is described, in such a case that a navigation operation is carried out in a traveling car.

Figure 5:
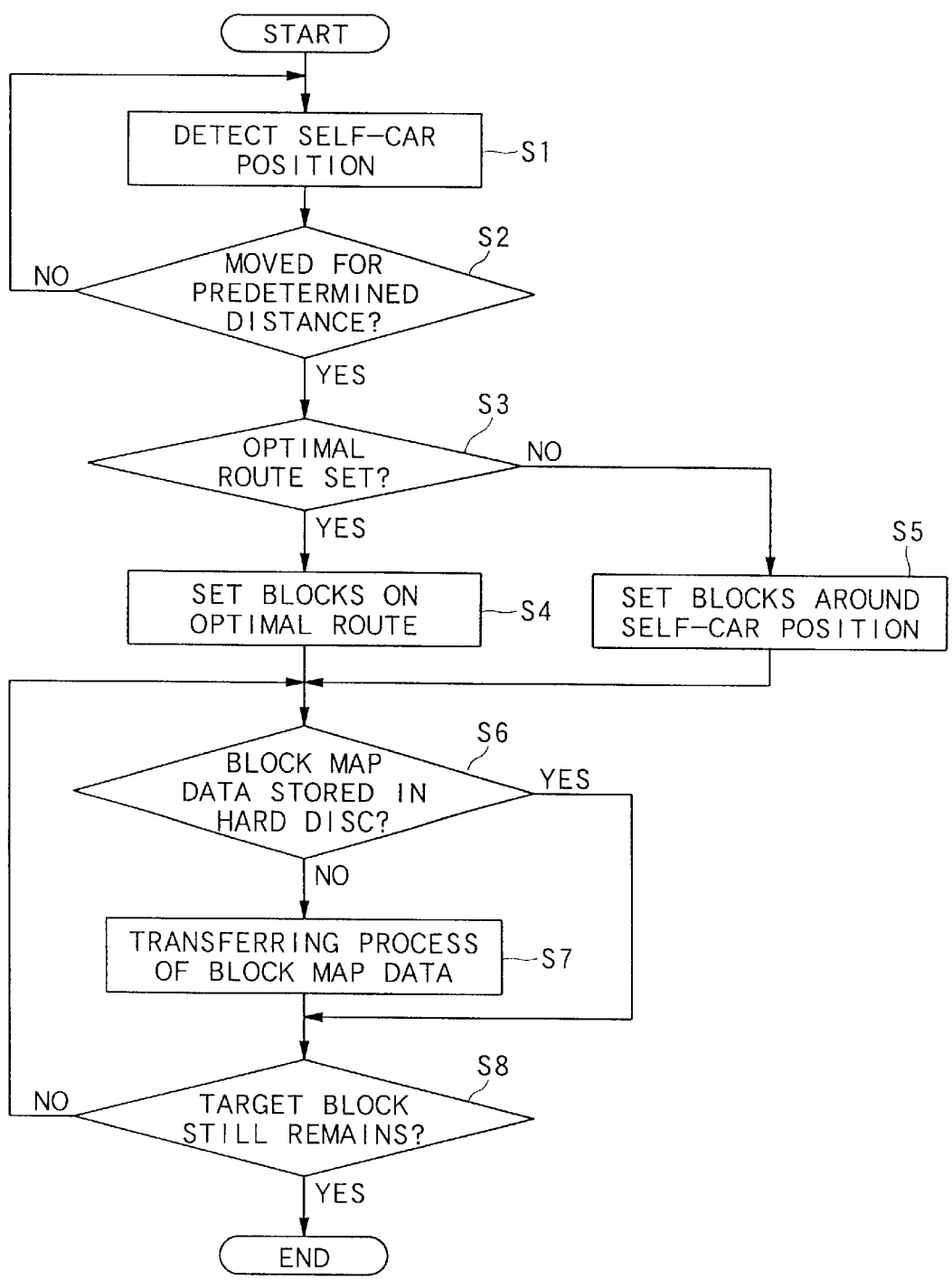
FIG. 5 is a flowchart showing an entire flow of a transferring process in the embodiment.

FIG. 5 is a flowchart showing the transferring process of the map data according to this embodiment.

In FIG. 5 at first, the self-car position is detected (step S1). That is, the self-car position data including the latitude and the longitude is determined in accordance with the sensor outputs from the sensor unit 16 and the measurement data from the GPS receiver 17.

Then, a movement distance from a position at which a previous transferring process is carried out is determined in accordance with the self-car position data determined at the step S1, and it is judged whether or not this movement distance exceeds a predetermined distance set in advance (step S2). That is, although the execution timing of the transferring process may be variously set, the transferring process is executed at a timing when the car moves for each predetermined distance, in this embodiment. Besides it, the transferring process may be executed for each movement of the block of the car, or may be executed at a timing of an elapse of a predetermined time period set in advance.

According to the judgment result at the step S2, if the movement distance of the car does not reach the predetermined distance (Step S2: NO), the transferring process is not carried out, and the operational flow returns back to the step S1. On the other hand, if the movement distance of the car reaches the predetermined distance (Step S2: YES), the operational flow proceeds to a step S3.

Then, it is judged whether or not an optimal route for a desirable destination is already set in the navigation system (step S3). In the navigation system, the optimal route may be set in advance by using a predetermined operation of the input device 19, in order to make a user know a route for the desirable destination. According to the judgment result at the step S3, if the optimal route is already set (Step S3: YES), the operational flow proceeds to a step S4. If the optimal route is not set (Step S3: NO), the operational flow proceeds to a step S5.

In this embodiment, a block area targeted for the transferring operation is defined in accordance with the self-car position, in order to reduce a data amount of the map data to be transferred in some degrees and also transfer effective map data having a high usability. As a method of defining such a block area, there are two methods for example. The process at the step S4 corresponds to a case in which the block areas along the optimal route are defined as the transfer target. The process at the step S5 corresponds to a case in which the block areas around the self-car position are defined as the transfer target.

Figure 6:
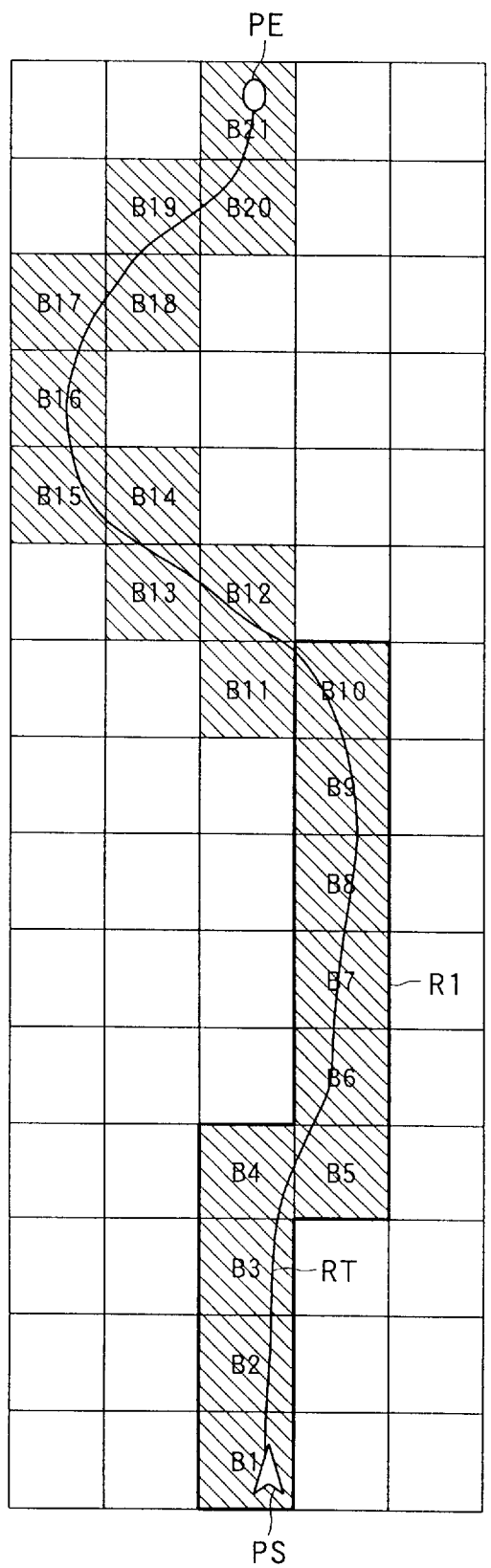
FIG. 6 is a diagram showing a block area along an optimal route targeted for the transferring process in the embodiment.

FIG. 6 is a diagram showing an example of the block areas targeted for the transferring operation at the step S4. For simplicity, a total range of 75 blocks consisting of 5 blocks in the lateral direction and 15 blocks in the longitudinal direction as viewed from the car is considered here.

As shown in FIG. 6, a range overlapped with an optimal route RT set in the navigation system is set as a block area R1 targeted for the transferring operation at the step S4. That is, the optimal route RT from a start position PS to the destination PE is determined in accordance with a predetermined operation. If it is set, 21 blocks from a block B1 including the start position PS, through blocks B2 to B20 in the course of the passage of the optimal route RT, to a block B21 including the destination PE is overlapped with the optimal route RT. The meshed rectangular area is used as the block, as mentioned above. Thus, the block overlapped with the optimal route RT can be determined in accordance with the latitude and the longitude at each point on the optimal route RT.

In addition, the blocks positioned at the peripheral of the blocks B1 to B10 overlapped with the optimal route RT may be included in the block area R1.

Here, the reason why the number of blocks included in the block area R1 is set to "10" is to limit the processing time required for the transferring operation even if there are many blocks on the optimal route RT. Therefore, the number of blocks, which become the target of one transferring operation with respect to the hard disc 15, is limited to an appropriate number depending upon the processing time. In FIG. 6, the example in which the number of blocks is limited to "10" is indicated. Upon transferring the block map data, the block map data corresponding to each block within the area R1 is sequentially stored into the map data storage area 15a of the hard disc 15.

Figure 7:
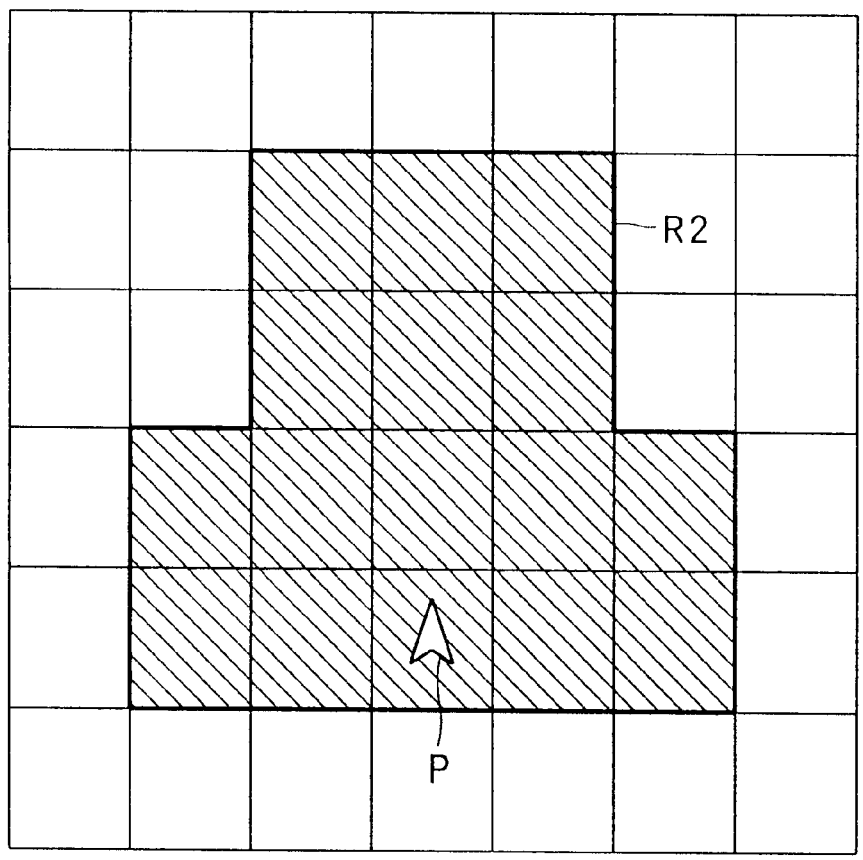
FIG. 7 is a diagram showing a block area around a self-car position targeted for the transferring process in the embodiment.

On the other hand, FIG. 7 is a diagram showing an example of the block area targeted for the transferring operation at the step S5. Here, for simplicity, a total range of 42 blocks consisting of 7 blocks in the lateral direction and 6 blocks in the longitudinal direction as viewed from the car is considered.

In FIG. 7, assuming that the car is located at a self-car position P and also the advancing direction is an upper direction, an area R2 (i.e., an area indicated by hatched lines in FIG. 7) corresponds to the block area targeted for the transferring operation at the step S5. That is, since the optimal route RT is not determined, differently from the case of FIG. 6, the area R2 including 16 blocks in total is relatively widely set on a front side in the advancing direction by considering the possibility of the passage of the car after an elapse of a short time. By the way, the area R2 shown in FIG. 7 can be used even if the advancing direction of the car is any of north, south, east and west directions.

By the way, the shape of the area R2 and the number of blocks are not limited to those shown in FIG. 7. It is possible to set a block area having the proper number of blocks and the proper shape around the self-car position. It is desirable that the block area around the self-car position is properly defined in accordance with a frequency of the transferring process, the size of each block and the like. The block area may not be fixed but may be variable depending upon the condition.

Then, when the process at the step S4 or S5 is ended, it is judged whether or not the block map data corresponding to each block of the above-judged area R1 or R2 is already stored in the hard disc 15 (step S6). Namely, since it is not necessary to transfer the block map data, which has been already transferred and stored in the map data storage area 15b of the hard disc 15, the presence or absence of the corresponding block map data is judged here. Upon conducting the judgment at the step S6, the data names registered in the management area 15a may be sequentially referred to.

According to the judgment result at the step S6, if the targeted block map data is not stored in the hard disc 15 (Step S6: NO), the transferring process of the block map data is carried out (step S7). On the other hand, if the targeted block map data is already stored in the hard disc 15 (Step S6: YES), it does not carry out the transferring process at the step S5, and the operational flow proceeds to a step S8.

Then, it is judged whether or not the targeted block still remains in the area R1 or the area R2 (step S8). According to the judgment result, if the targeted block still remains (Step S8: YES), the operational flow returns to the step S6, so as to perform the processes at the steps S6 to S8 on the block. On the other hand, if all the targeted blocks are completely transferred (Step S8: NO), the transferring process of FIG. 5 is ended.

In this manner, the block map data of each block included in the area determined by the self-car position is stored into the hard disc 15. After that, when the car travels in the same area, it is possible to perform the navigation operation by using the hard disc 15 in place of the DVD-ROM 1. In this case, when the block map data required for the displaying process etc., is identified, the hard disc 15 is accessed. Then, the presence or absence of the corresponding block map data is checked on the basis of the data names with referring to the management area 15a. If the corresponding block map data is already stored in the map data storage area 15b, this is read out. On the other hand, if the corresponding data name does not exist in the management area 15a, the DVD-ROM drive 14 is accessed, so that the block map data recorded in the DVD-ROM 1 is read out.

Figure 8:
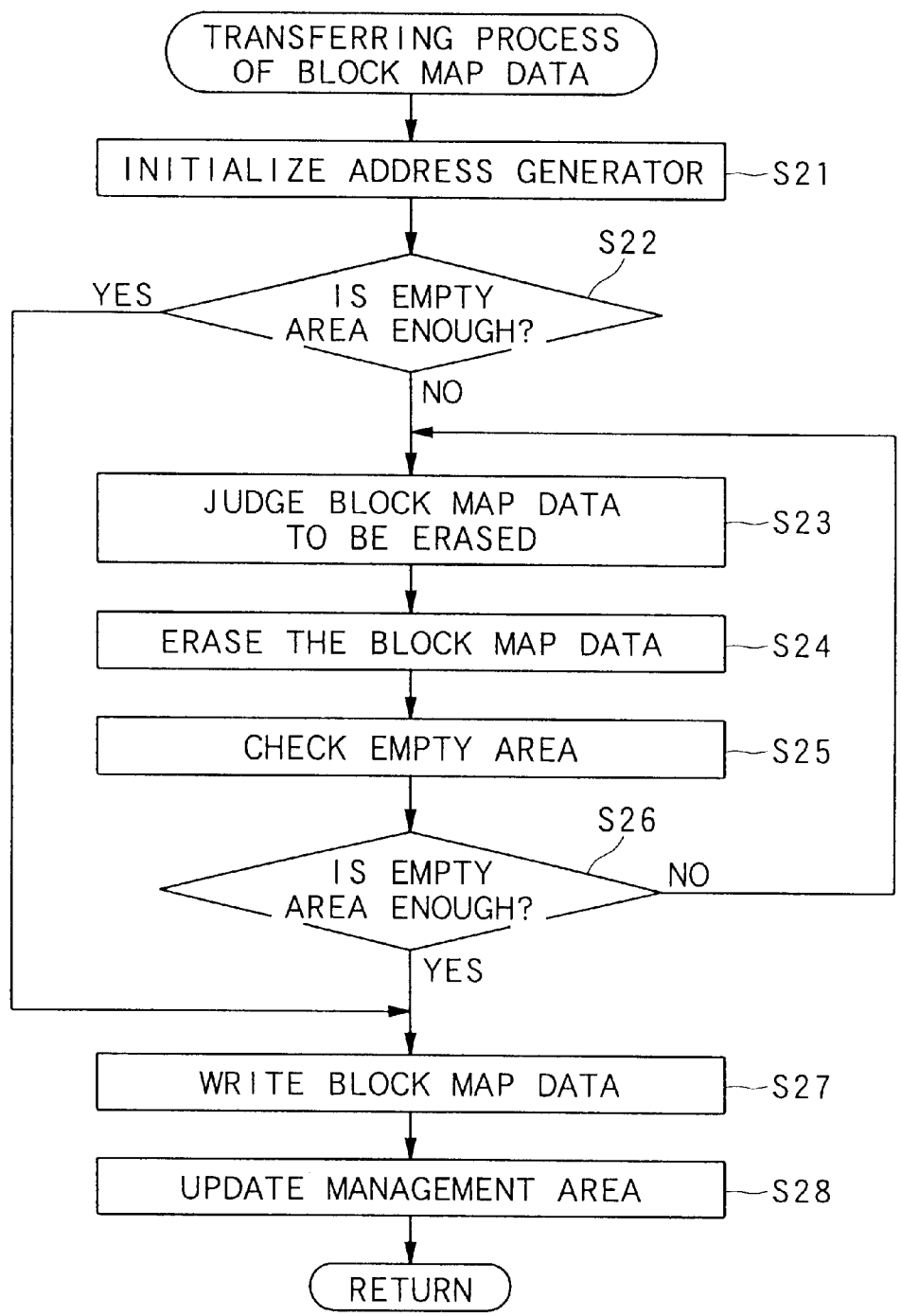
FIG. 8 is a flowchart showing a process of transferring block map data from the DVD-ROM to a hard disc in the embodiment.

Next, with reference to FIG. 8, the transferring process of transferring the block map data as the transfer target to the hard disc 15 at the step S7 in FIG. 5 is explained. In FIG. 8, at first, the empty storage area in the map data storage area 15b of the hard disc 15 shown in FIG. 8 is checked. Namely, as shown in FIG. 4, the empty storage area can be obtained by subtracting the sum value Sd of the already stored block map data from the storage capacity Sa assigned to the map data storage area 15b.

Then, the empty storage area obtained at the step S21 is compared with a predetermined reference value, and it is judged whether or not the empty storage area runs short (step S22). For example, in case of newly storing the block map data, which has the data size S, it may be judged whether or not the empty storage area is reserved with more than the data size S. According to the judgment result at the step S22, if the empty storage area runs short i.e., if the empty storage area is not enough (step S22: NO), the flow proceeds to a step S23. If the empty storage area is enough (step S22: YES), the operational flow jumps to a step S27.

At the step S23, since the empty storage area, where the block map data as the transfer target is to be written, is not enough in the map data storage area 15b, at least one block map data is judged as unnecessary data. Namely, by erasing one block map data which has been already stored, at least the empty storage area having the data size S can be newly obtained, so that the block map data can be newly written. Therefore, one block map data to be erased is selected here.

At the step S23, there are various methods of judging one or more block map data to be erased as the unnecessary data. In the present embodiment, three methods are proposed for example. In a first method, the block map data corresponding to the block whose distance from the self-car position is the farthest among a plurality of block map data, which are already stored in the map data storage area 15b, as the unnecessary data. In a second method and a third method, the unnecessary data is determined on the basis of the management information in the management area 15a. More concretely, in the second method, the block map data, the number of accesses for which is the minimum among a plurality of block map data, which are already stored in the map data storage area 15b, is judged as the unnecessary data. In the third method, the block map data, the date and time of access for which is the oldest among a plurality of block map data, which are already stored in the map data storage area 15b, is judged as the unnecessary data. Those three methods will be described later.

Then, the block map data which has been judged as the unnecessary data at the step S23 is actually erased from the map data storage area 15b (step S24). Then, in the same manner as the steps S21 and S22, the empty storage area of the map data storage area 15b is checked (steps S25 and S26), so that it is judged whether or not the empty storage area is enough. Namely, as a result of erasing the block map data at the step S24, it is judged again whether or not the empty storage area capable of writing the new block map data is reserved in the map data storage area 15b.

As a result of the judgment at the step S26, if the empty storage area is not enough (step S26: NO), the erasing process is repeated as the operational flow returns to the step S23 so as to perform the steps S23 to the step S26 again. On the other hand, if the empty storage area is enough (step S26: YES), the operational flow proceeds to the step S27.

By the way, in case that each block map data stored in the map data storage area 15b has the same data size, the processes at the steps S25 and S26 are not necessary. Thus, at the stage after erasing one block map data, the empty storage area where the new block map data is to be written can be automatically reserved. In contrast, in the case of the flowchart shown in FIG. 8, it is assumed that a plurality of block map data whose data sizes are different from each other are included, to thereby perform the processes at the steps S25 and S26. By this, in case that the block map data whose data size is relatively large is to be written into the map data storage area 15b, there is a possibility that two or more block map data are erased to reserve the empty storage area.

Then, the block map data as the transfer target is written at the record position corresponding to the reserved empty storage area in the map data storage area 15b (step S27). In this way, the record position of the newly written block map data is determined depending upon the block map data, which has been judged as the unnecessary data, resulting in an irregular arrangement.

Then, the management information of the management area 15a is updated (step S28). Namely, the management information of the block map data which has been erased is cancelled, and the data name, the number of accesses and the date and time of access of the new block map data are registered as the management information of the new block map data as the transfer target. By the way, at this stage, the number of accesses may be set to "0", the date and time of access may be set to the date and time when the block map data is recorded into the hard disc 15. When the step S28 is ended, the operational flow returns to the step S8 in FIG. 5.

Here, the three methods for judging the block map data as the unnecessary data will be explained.

At first, a case in which the first method is applied to the step S23 of FIG. 8 is considered. In the first method, the block map data corresponding to the block, which is farthest from the self-car position, is judged as the unnecessary data. First of all, the distance between the block including the self-car position and each block corresponding to the block map data already stored in the map data storage area 15b is respectively obtained. As described above, since the block position can be uniformly determined with referring to each data name, it is possible to easily calculate the distance between those two blocks.

As a concrete example of the first method, it is assumed that each block uniformly has a size in a length L1 (km) in the south and north direction and in a length L2 (km) in the east and west direction, and that the block including the self-car position and the corresponding block is separated from each other in the south and north direction by N1 blocks and in the east and west direction by N2 blocks. In this case, the block distance can be calculated by obtaining the interval N1×L1 (km) in the south and north direction and the interval N2×L2 (km) in the east and west direction, then obtaining the square root of the square sum of those intervals. By performing such a calculation for all the block map data stored in the map data storage area 15b, one of the blocks, the obtained block distance of which is the maximum, is judged as the unnecessary data.

If the longitude and latitude coordinates corresponding to the block map data are included as the information for the block map data, the distance between the blocks may be obtained by using the respective block map data of the blocks stored in the hard disc 15 and the longitude and latitude coordinates of the block map data of the block including the self-car position.

Figure 10:
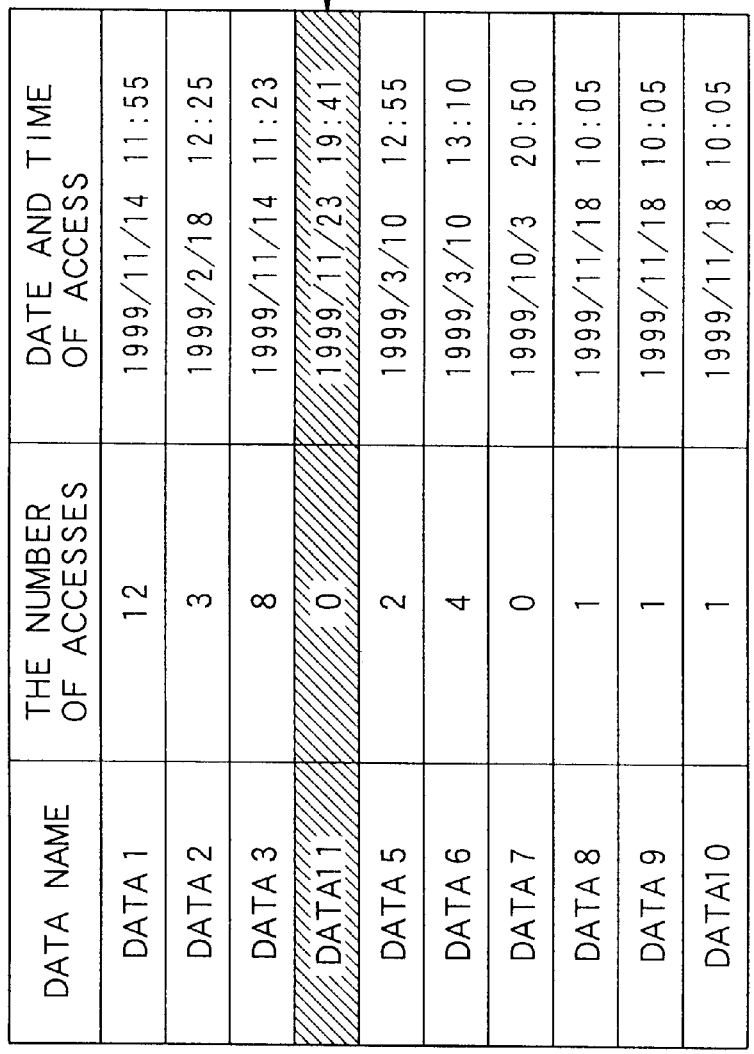
FIG. 10 is a diagram showing a storage condition of the hard disc after applying an erasing operation by a second method in relation to a judgment of the block map data not required for the navigation operation in the embodiment.

Next, a case in which the second and third methods are applied to the step S23 of FIG. 8 is considered with reference to FIG. 9 to FIG. 11. In FIG. 9 to FIG. 11, for the convenience sake, a case in which the storage capacity Sa corresponding to 10 blocks of the block map data in total is assigned to the map data storage area 15b is explained.

FIG. 9 shows one example of a data structure of the management area 15a before performing the erasing process. As shown in FIG. 9, a case is explained hereinbelow in which the 10 blocks of the block map data in total from the DATA 1 to DATA 10 which were transferred to the hard disc 15 in the past, are registered in the management area 15a and the number of accesses and the date and time of access of the respective block map data are held. In addition, it is assumed that all the block map data DATA 1 to DATA 10 and the block map data as the transfer target have the same data sizes to each other.

In the second method, the block map data, the number of accesses for which is the minimum in the management area 15a shown in FIG. 9, is judged as the unnecessary data. In the example of FIG. 9, each of the number of accesses for the DATA 4 and the number of accesses for the DATA 7 is "0" (which indicates that those data are not used for the reading out process after they were transferred to the hard disc 15), which is the minimum. Here, since it is enough to determine just one unnecessary data to be erased, the DATA 4, which is closer to the head, is selected as the unnecessary data. Thus, at the step S23 in FIG. 8, the DATA 4 is judged as the unnecessary data, and is erased from the map data storage area 15b at the step S24.

FIG. 10 shows the data structure of the management area 15a in case that new block map data DATA 11 is stored after the block map data DATA 4 is erased by performing the steps S27 and S28 of FIG. 8 according to the second method. As a result of the erasing process and transferring process, in the management area 15a of FIG. 10, the DATA 11 (indicated by hatched lines) is registered in place of the original DATA 4. The number of accesses for the DATA 11 is updated to "0" and the date and time of access for the DATA 11 is updated to the date and time when the DATA 11 is transferred to the hard disc 15. Thus, the block map data DATA 11 is stored at the record position of the original DATA 4 in the map data storage area 15b in correspondence with the management area 15a in FIG. 10.

In the third method, the block map data, the date and time of access for which is the oldest in the management area 15a shown in FIG. 9, is judged as the unnecessary data. In the example of FIG. 9, the date and time of access for the DATA 2 is the oldest. Thus, at the step S23 in FIG. 8, the DATA 2 is judged as the unnecessary data, and is erased from the map data storage area 15b at the step S24.

FIG. 11 shows the data structure of the management area 15a in case that new block map data DATA 11 is stored after the block map data DATA 2 is erased by performing the steps S27 and S28 of FIG. 8 according to the third method. As a result of the erasing process and transferring process, in the management area 15a of FIG. 11, the DATA 11 (indicated by hatched lines) is registered in place of the original DATA 2. Each management information is updated in the same manner as the case of FIG. 10. Thus, the block map data DATA 11 is stored at the record position of the original DATA 2 in the map data storage area 15b in correspondence with the management area 15a in FIG. 11.

Incidentally, it may be selected by the user which one of the above explained first to third methods is used in order to determine the block map data to be the unnecessary data. Namely, a desirable method among the above explained first to third methods is selected by the user on a function setting picture plane for setting a function of the navigation, so that the selected method is performed at the step S23.

As described above, according to the present embodiment, the block map data included in a predetermined area in correspondence with the self-car position, among the map data recorded in the DVD-ROM 1, is transferred from the DVD-ROM drive 14 to the hard disc 15. Further, the empty storage area of the map data storage area 15b is checked and the transferring process is performed after erasing the unnecessary block map data if the empty storage area runs short. Therefore, even if there is a certain limit in the storage capacity assigned to the map data storage area 15b, it is possible to automatically reserve the empty storage area where the new block map data can be stored, so that it is possible to store the map data, which is always new and highly useful for the user, in the hard disc 15.

In the present embodiment, since the unnecessary data to be erased is judged, various conditions can be set. By the first method, since the block map data corresponding to the block which is the farthest from the self-car position is judged as the unnecessary data, it is possible to erase the block map data where the possibility that the self-car travels is little. By the second method, since the block map data, the number of accesses for which is the minimum among the management information is judged as the unnecessary data, it is possible to erase the block map data, which was not often used in the past. By the third method, since the block map data, the date and time of access for which is the oldest among the management information is judged as the unnecessary data, it is possible to erase the block map data which recently tends to be less used. In this manner, by various methods, it is possible to erase the block map data, which is evaluated to be relatively less useful, from the map data storage area 15b.

In the above embodiments, the unnecessary data erased at the time of transferring the map data to the hard disc 15 is selected from among the block map data already stored in the map data storage area 15b. However, instead of or in addition to this, various data such as the music data, video data or the like stored in the hard disc 15 may be erased as the unnecessary data.

In the above embodiment, such a case that the DVD-ROM 1 is used as the record medium in which the map data is recorded is described. However, the record format to the record medium is not limited to the DVD format. The record medium is not limited to the optical disc or the like. For example, it is possible to apply the present invention to such a case that the map data is downloaded through a network.

The navigation system according to the embodiment is not limited to the case in which it is attained as the individual navigation apparatus. For example, it can be attained by the combination with a personal computer having a hard disc. In this case, the function of the embodiment can be attained by driving a software to carry out the transferring process of the present invention in the personal computer.

Figure 12:
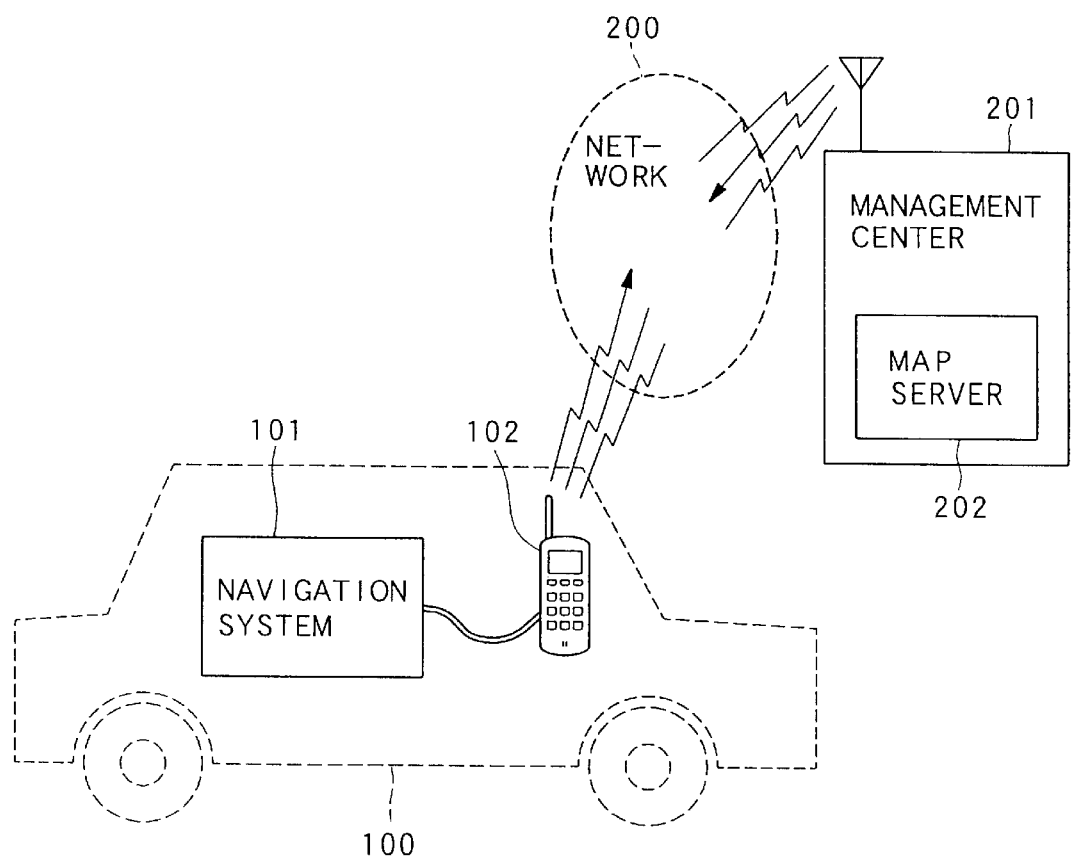
FIG. 12 is a block diagram showing a modified embodiment of the present invention.

Further, as shown in FIG. 12, the block map data may be transferred to a car 100 from a map server 202, which is equipped in a management center 201, which totally manages the map data and which is located at the outside of the car 100, through a communication network 200, in place of the record medium such as a DVD-ROM in which the map data is recorded. In this case, a portable telephone 102 may be equipped in the car 100 as one example of a communication device, so that, when the block map data to be stored into the hard disc 15 (not shown in FIG. 12) in a navigation system 101 is determined on the side of the car 100 (the block map data to be stored into the hard disc 15 may be judged by using the above described method), the map server 202 at the management center 201 may be accessed by the portable telephone 102 through the communication network 200. Then, the block map data requested by the car 100 is downloaded. By transferring the map data from the map server 202 through the communication network 200 in this way, the record medium such as a DVD-ROM or the like of read only type, on which the map data is recorded, is not necessary.

In the above described embodiment, the navigation system is equipped in a car. However, the present invention is not limited to this. For example, the navigation system of the present invention may be equipped in a movable body other than a car, or may be equipped in a portable electronic equipment such as a portable telephone, a mobile computer, a lap top computer or the like, which can be used for navigating a person who is walking. In other ward, the movable body as the target for the navigation operation may be a person using such a portable electronic equipment.

As described above, according to the present embodiment, upon transferring the map data in a certain area to the hard disc 15, if the empty storage area of the hard disc 15 runs short, the unnecessary data is judged on the basis of the predetermined condition, and the map data is stored after erasing the unnecessary data. Thus, it is possible to avoid such a situation that the empty storage area runs short because of the presence of the map data stored in the past, and that the new map data cannot be stored. Therefore, it is possible to realize a navigation system, which can be used comfortably and in which the storage area can be efficiently used.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosure of Japanese Patent Application No.11-347877 filed on Dec. 7, 1999 including the specification, claims, drawings and summary is incorporated herein by reference in its entirety.

What is claimed is:

1. A navigation system for detecting a present position of a movable body and performing a navigation for the movable body on the basis of map information, said navigation system comprising:

a storage device of non-volatile type capable of writing the map data thereinto and reading the map data therefrom;

a map data transferring device for obtaining the map data corresponding to a predetermined area, and transferring and storing the map data corresponding to the predetermined area to said storage device;

an empty area judging device for judging whether or not an empty storage area having a predetermined capacity is reserved in said storage device when said map data transferring device is to transfer the map data corresponding to the predetermined area to said storage device; and an erasing device for determining unnecessary data among the map data transferred and stored in said storage device on the basis of management information, which is correlated with the map data stored in said storage device, and erasing the unnecessary data from said storage device if said empty area judging device judges that the empty storage area is not reserved, wherein the map data comprises a plurality of block map data for each unit block obtained by dividing a whole map into unit blocks.

2. A navigation system according to claim 1, further comprising a map data reading device for accommodating a record medium, in which the map data is recorded, and reading the map data from said record medium.

3. A navigation system according to claim 2, wherein said storage device is capable of writing and reading the map data at an access speed faster than that of said map data reading device.

4. A navigation system according to claim 3, wherein said storage device comprises a hard disc device.

5. A navigation system according to claim 4, wherein a map data storage area for storing the transferred map data is set in said storage device.

6. A navigation system according to claim 1, wherein the management information comprises the number of accesses for the map data stored in said storage device, and said erasing device determines the map data, the number of accesses for which is the minimum, as the unnecessary data.

7. A navigation system according to claim 1, wherein the management information comprises date and time of access for the map data stored in said storage device, and said erasing device determines the map data, the date and time of access for which is the oldest, as the unnecessary data.

8. A navigation system according to claim 1, wherein writing and reading with respect to said storage device is performed by the block map data as unit.

9. A navigation system according to claim 8, wherein all of the plurality of block map data have data sizes same to each other.

10. A navigation system according to claim 8, wherein said map data transferring device judges whether or not the block map data to be transferred is already stored in said storage device, and transfers the block map data only if it is not judged to be stored in said storage device.

11. A navigation system according to claim 1, further comprising a communication device for obtaining the map data to be transferred and stored to said storage device.

12. A navigation system according to claim 11, wherein said communication device comprises a portable telephone.

13. A navigation system according to claim 11, wherein said communication device obtains the map data through a communication network.

14. A navigation system for detecting a present position of a movable body and performing a navigation for the movable body on the basis of map information, said navigation system comprising:

a storage device of non-volatile type capable of writing the map data thereinto and reading the map data therefrom;

a map data transferring device for obtaining the map data corresponding to a predetermined area, and transferring and storing the map data corresponding to the predetermined area to said storage device;

an empty area judging device for judging whether or not an empty storage area having a predetermined capacity is reserved in said storage device when said map data transferring device is to transfer the map data corresponding to the predetermined area to said storage device; and an erasing device for determining unnecessary data among data stored in said storage device on the basis of a predetermined condition, and erasing the unnecessary data from said storage device if said empty area judging device judges that the empty storage area is not reserved, said erasing device determines the unnecessary data among the map data transferred and stored in said storage device, wherein said erasing device determines the unnecessary data on the basis of management information, which is correlated with the map data stored in said storage device, the management information comprises the number of accesses for the map data stored in said storage device, and said erasing device determines the map data, the number of accesses for which is the minimum, as the unnecessary data.

15. A navigation system for detecting a present position of a movable body and performing a navigation for the movable body on the basis of map information, said navigation system comprising:

a storage device of non-volatile type capable of writing the map data thereinto and reading the map data therefrom;

a map data transferring device for obtaining the map data corresponding to a predetermined area, and transferring and storing the map data corresponding to the predetermined area to said storage device;

an empty area judging device for judging whether or not an empty storage area having a predetermined capacity is reserved in said storage device when said map data transferring device is to transfer the map data corresponding to the predetermined area to said storage device; and an erasing device for determining unnecessary data among data stored in said storage device on the basis of a predetermined condition, and erasing the unnecessary data from said storage device if said empty area judging device judges that the empty storage area is not reserved, said erasing device determines the unnecessary data among the map data transferred and stored in said storage device, wherein said erasing device determines the unnecessary data on the basis of management information, which is correlated with the map data stored in said storage device, wherein the management information comprises date and time of access for the map data stored in said storage device, and said erasing device determines the map data, the date and time of access for which is the oldest, as the unnecessary data.

16. A navigation system for detecting a present position of a movable body and performing a navigation for the movable body on the basis of map information, said navigation system comprising:

a storage device of non-volatile type capable of writing the map data thereinto and reading the map data therefrom;

a map data transferring device for obtaining the map data corresponding to a predetermined area, and transferring and storing the map data corresponding to the predetermined area to said storage device;

an empty area judging device for judging whether or not an empty storage area having a predetermined capacity is reserved in said storage device when said map data transferring device is to transfer the map data corresponding to the predetermined area to said storage device; and an erasing device for determining unnecessary data among the map data transferred and stored in said storage device on the basis of a predetermined condition, and erasing the unnecessary data from said storage device if said empty area judging device judges that the empty storage area is not reserved, wherein said erasing device determines the map data corresponding to an areal block, which is farthest from the present position, as the unnecessary data, wherein the map data comprises a plurality of block map data for each unit block obtained by dividing a whole map into unit blocks.

* * * * *